(12) United States Patent
Kitajima

(10) Patent No.: US 6,612,511 B2
(45) Date of Patent: Sep. 2, 2003

(54) COMPONENT ASSEMBLY FOR FISHING REEL

(75) Inventor: Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/310,827

(22) Filed: Dec. 6, 2002

(65) Prior Publication Data

US 2003/0136867 A1 Jul. 24, 2003

(30) Foreign Application Priority Data

Jan. 22, 2002 (JP) ........................................ 2002-013291

(51) Int. Cl.[7] .............................................. A01K 89/02
(52) U.S. Cl. ...................................... 242/246; 242/303
(58) Field of Search ............................... 242/244, 246, 242/296, 302, 303, 304

(56) References Cited

U.S. PATENT DOCUMENTS

| | | | | |
|---|---|---|---|---|
| 4,911,378 A | * | 3/1990 | Hitomi ........................ 242/246 |
| 5,199,664 A | * | 4/1993 | Kuntze et al. ............... 242/228 |
| 5,370,329 A | * | 12/1994 | Kono .......................... 242/246 |
| 5,544,832 A | * | 8/1996 | Okamoto .................... 242/245 |
| 5,564,640 A | * | 10/1996 | Egasaki et al. ............. 242/246 |
| 5,816,516 A | * | 10/1998 | Yamaguchi .................. 242/246 |
| 5,904,309 A | * | 5/1999 | Takeuchi ..................... 242/243 |
| 5,918,826 A | * | 7/1999 | Arkowski .................... 242/295 |
| 5,947,400 A | * | 9/1999 | Tsutsumi .................... 242/322 |
| 6,283,393 B1 | * | 9/2001 | Kang .......................... 242/246 |
| 6,286,772 B1 | * | 9/2001 | Koelewyn .................... 242/246 |
| 6,446,893 B2 | * | 9/2002 | Yamaguchi .................. 242/246 |

* cited by examiner

*Primary Examiner*—Emmanuel Marcelo
(74) *Attorney, Agent, or Firm*—Shinjyu Global IP Counselors, LLP

(57) ABSTRACT

A drag knob of a spinning reel includes a main knob unit, a presser unit and a retaining member. The knob unit is a die-cast member having a concave portion provided on the rear side, and interlocking grooves that are formed on the front side at a certain spacing in circumferential direction, and extend along an axis direction through an outer periphery of the concave portion up to a groove end. A portion of the presser unit is accommodated in the concave portion. The retaining member has corner portions that interlock with the interlocking grooves, and contact portions that are formed in one piece with the corner portions and contact the presser unit from the rear side. The retaining member has enough elasticity to be mounted in the concave portion to retain the presser unit. The present invention reduces the manufacturing costs of a fishing reel.

18 Claims, 11 Drawing Sheets

COMPONENT ASSEMBLY FOR FISHING REEL

BACKGROUND OF THE INVENTION

1. Field of the Invention

This invention generally relates to assemblies. More specifically, the present invention relates to component assemblies used for fishing reels.

2. Background Information

In front-drag spinning reels, the drag disks (example of a second component) of a drag mechanism are accommodated inside a spool (example of a first component).

The drag force of the drag disks is adjusted with a drag knob that is screwed to a spool shaft.

The spool is mounted rotatably to the front end of the spool shaft, and at least one of the drag disks is mounted non-rotatably to the spool shaft. A columnar concave portion accommodating the drag disks is formed at a front surface of the spool. In the conventional art, to retain the drag disks accommodated in the concave portion, an annular groove is formed for example by a machining process on the front side of the concave portion, and a spring member is formed by bending an elastic wire made of metal into a polygon were. In this conventional drag disk retaining structure, the corner portions of the spring member interlock with the annular groove, and the straight portions between the corner portions are in contact with the drag disks, thereby retaining the drag disks.

The drag knob includes a main knob unit (example of a first component) made of synthetic resin screwed to the spool shaft, and a presser unit (example of a second component) made of synthetic resin, which is mounted non-rotatably to the spool shaft and presses against the drag disks. The main knob unit is a disk-shaped member, in which a knob portion for the adjustment operation is formed on the front surface, protruding for example along its diameter. A concave portion is provided in the rear surface of the knob unit, and at least a portion of the presser unit is accommodated in this concave portion. The presser unit is a substantially columnar member having a brim portion, which is accommodated in the concave portion and retained by a retaining structure, so that the knob unit and the presser unit move unitarily back and forth. In the conventional art, to retain the presser unit accommodated in the concave portion, an annular groove is formed for example by a machining process on the rear side of the concave portion, and a spring member is formed by bending an elastic piece of wire made of metal into a polygon. In this conventional presser unit retaining structure, as in the conventional drag disk retaining structure, the corner portions of the spring member interlock with the annular groove, similar to the retaining structure of the drag disks, and the straight portions between the corner portions are in contact with the presser unit, thereby retaining the presser unit.

Problems Solved by the Invention

In these conventional retaining structures, an annular groove is formed by a machining process in the concave portion of the spool or the main knob unit, the corner portions of the spring member interlock with this annular groove, and the straight portions are in contact with the drag disks or the presser unit, thus to retain them. Therefore, even if the spool or the knob unit is formed by die-casting for example, the annular groove has to be formed by a machining process after the die-casting, which increases the processing costs.

In view of the above, there exists a need for a component assembly for a fishing reel which overcomes the above mentioned problems in the prior art. This invention addresses this need in the prior art as well as other needs, which will become apparent to those skilled in the art from this disclosure.

SUMMARY OF THE INVENTION

It is thus a purpose of the present invention to provide a component assembly for a fishing reel, with which the processing costs can be reduced.

In accordance with the first aspect of the invention, a component assembly for a fishing reel includes a first component, a second component and a retaining member. The first component includes a body extending along an axis and having first and second end faces at opposite ends of the axis, a cylindrical concave portion, formed on the first end face, and a plurality of interlocking grooves that is formed on an inner surface of the cylindrical concave portion and opens to the second end face. The plurality of interlocking grooves extends in a direction of the axis of the body up to a groove end which is formed on an axial opposite side of the first end face. The plurality of interlocking grooves is formed at a certain spacing in a circumferential direction. At least a portion of the second component is accommodated in the cylindrical concave portion. The retaining member can be inserted into the cylindrical concave portion from a first-end-face side. The retaining member has a plurality of engagement portions interlocking with the plurality of interlocking grooves such that the second component is retained in the cylindrical concave portion, and a plurality of contact portions that is formed in one piece with the plurality of engagement portions and can contact the second component from the first-end-face side.

In this component assembly, at least a portion of the second component is accommodated in the cylindrical concave portion of the first component from its first end side. For this, the second component is mounted into the cylindrical concave portion from the aperture side while compressing the retaining member so that it can pass through the aperture. The compression is released after positioning the engagement portions with the interlocking grooves formed in the outer edge of the cylindrical concave portion. Since the interlocking grooves are formed only up to the groove end, which is at a position short of the first end face of the cylindrical concave portion, there is a level difference between the interlocking grooves and the first end face. Accordingly, the engagement portions are interlocked at this level difference. Also, the retaining member cannot be moved towards the aperture of the cylindrical concave portion of the first component. In this situation, the contact portions contact the second component on its first end side, so that also the second component cannot be moved toward the aperture. Thus, the second component is retained. The interlocking grooves are formed from the second end face towards the first end face, so that they can be formed by the die during the die-casting. Since the structure for interlocking with the retaining member is formed by die-casting, it can be accomplished without a machining process, so that the processing costs can be reduced.

A component assembly of a fishing reel in accordance with the second aspect of the invention is the assembly as set forth in the first aspect, wherein the retaining member is formed by bending an elastic wire. The plurality of engagement portions of the retaining member is a protruding from an outer peripheral surface of the second component. The contact portions are linking the plurality of the protruding engagement portions. With this configuration, the engagement portions and the contact portions can be made by bending a piece of wire to form the retaining member, so that the costs for the retaining member can be reduced.

A component assembly of a fishing reel of in accordance with the third aspect of the invention is the assembly as set forth in the second aspect, wherein the retaining member is formed by bending the wire into a polygon. The protruding portions are the corner portions of the polygon, and the contact portions are straight portions linking the corner portions. With this configuration, the retaining member can be formed by bending the wire into a simple polygon, so that the retaining member can be formed easily and the costs for the retaining member can be reduced.

A component assembly of a fishing reel in accordance with the fourth aspect of the invention is the assembly as set forth in any of first through third aspect, wherein the second component is rotatable with respect to the first component. With this configuration, the second component is retained by the first component even when the second component rotates with respect to the first component.

A component assembly of a fishing reel in accordance with the fifth aspect of the invention is the assembly as set forth in any of first through third aspects, wherein the second component is not rotatable with respect to the first component. With this configuration, the second component does not rotate with respect to the first component, so that it can be retained securely.

A component assembly of a fishing reel in accordance with the sixth aspect of the invention is the assembly as set forth in any of first through fifth aspects, wherein the first component is a main knob unit of a drag knob for adjusting drag force of a drag mechanism. The main knob unit is screwed to a front end of a spool shaft of a spinning reel. The second component is a presser member, at least a portion of which is accommodated in the main knob unit. The presser member presses against a drag disk of the drag mechanism. With this configuration, the processing costs of the drag knob can be reduced.

A component assembly of a fishing reel in accordance with the seventh aspect of the invention is the assembly as set forth in the sixth aspect, further comprising a spring member urging the presser member and the main knob unit away from one another. The main knob unit comprises a nut portion that is screwed to the spool shaft, and a nut accommodating portion that is formed at a center portion of the cylindrical concave portion, and that accommodates the nut portion such that the nut portion is non-rotatable but shiftable in axial direction. With this configuration, the presser member is pressed via the spring member by the nut portion, so that the pressing force changes gradually over a drag adjustment range that is broader than when the presser member is directly pressed by the nut portion.

A component assembly of a fishing reel of in accordance with the eighth aspect of the invention is the assembly as set forth in the seventh aspect, wherein the main knob unit has a tubular guide portion formed from the nut accommodation portion towards the first end face. The spring member is mounted inside the guide portion. With this configuration, when the main knob unit is turned and the spring member is compressed, then spring member is guided by the guide portion, so that spring member tends not to slip in radial direction.

A component assembly of a fishing reel in accordance with the ninth aspect of the invention is the assembly as set forth in any of first through fifth aspects, wherein the first component is a spool that is mounted via a drag mechanism to a front end of a spool shaft of a spinning reel. The second component includes at least one drag disk that is accommodated in the cylindrical concave portion and is a part of the drag mechanism. With this configuration, the processing costs of the spool can be reduced.

A component assembly of a fishing reel in accordance with the tenth aspect of the present invention is the assembly as set forth in any of first through ninth aspects, further comprising a seal member that is fixed to the second end face and closes the interlocking grooves. With this configuration, the interlocking grooves that open to the second end face are closed by the seal member, so that foreign matter such as dust, sand or liquids can be kept from entering into the cylindrical concave portion through the interlocking grooves. Furthermore, where the second end face is exposed to the outside, the seal member can improve the appearance of the reel.

A component assembly of a fishing reel in accordance with the eleventh aspect of the invention is the assembly as set forth in any of first through tenth aspects, wherein the cylindrical concave portion has a columnar shape and opens to the first end face. The interlocking grooves are formed on an inner surface of the cylindrical concave portion and open to the second surface, such that the interlocking grooves have a semi-circular cross section. With this configuration, the cylindrical concave portion is provided with a columnar shape, so that the second component can be rotated with respect to the first component when accommodated, and the interlocking grooves interlocking with the engagement portions are formed by circular round holes, so that the manufacturing of the die for forming the first component is easy.

A component assembly of a fishing reel in accordance with the twelfth aspect of the invention is the assembly as set forth in any of inventions first through eleventh aspects, wherein the first component is made of synthetic resin manufactured by die-casting, and the cylindrical concave portion and the interlocking grooves are formed by die-casting. With this configuration, the first operating member is made of synthetic resin by die-casting and is provided with a cylindrical concave portion and interlocking grooves, so that the manufacturing costs can be reduced and a lighter weight can be achieved.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 1 is a cross-sectional lateral view of the spinning reel shown in FIG. 1;

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Overall Configuration and Configuration of Reel Unit

Figure 1:
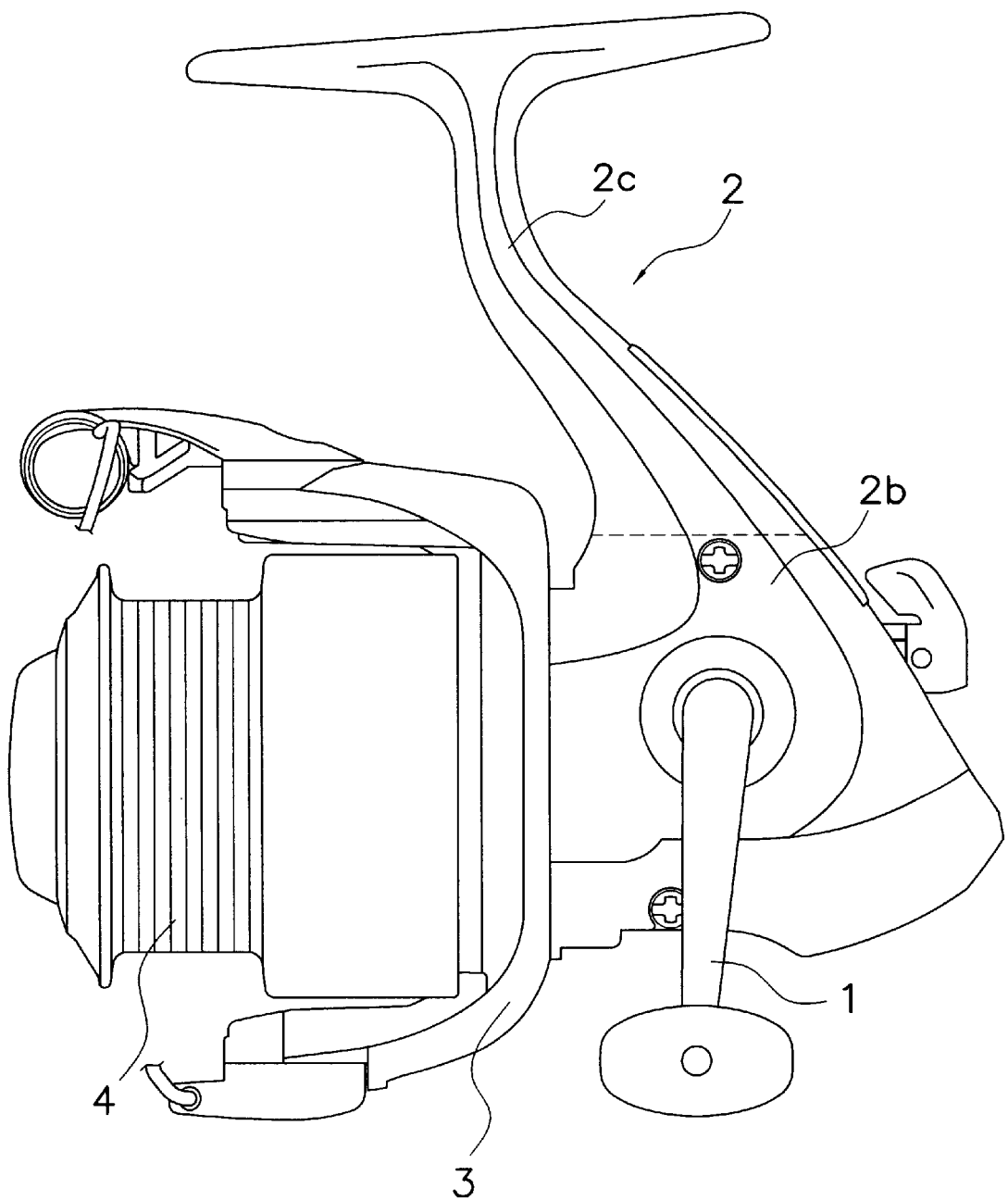
FIG. 1 is a lateral view of a spinning reel in accordance with a first embodiment of the present invention.
Figure 2:
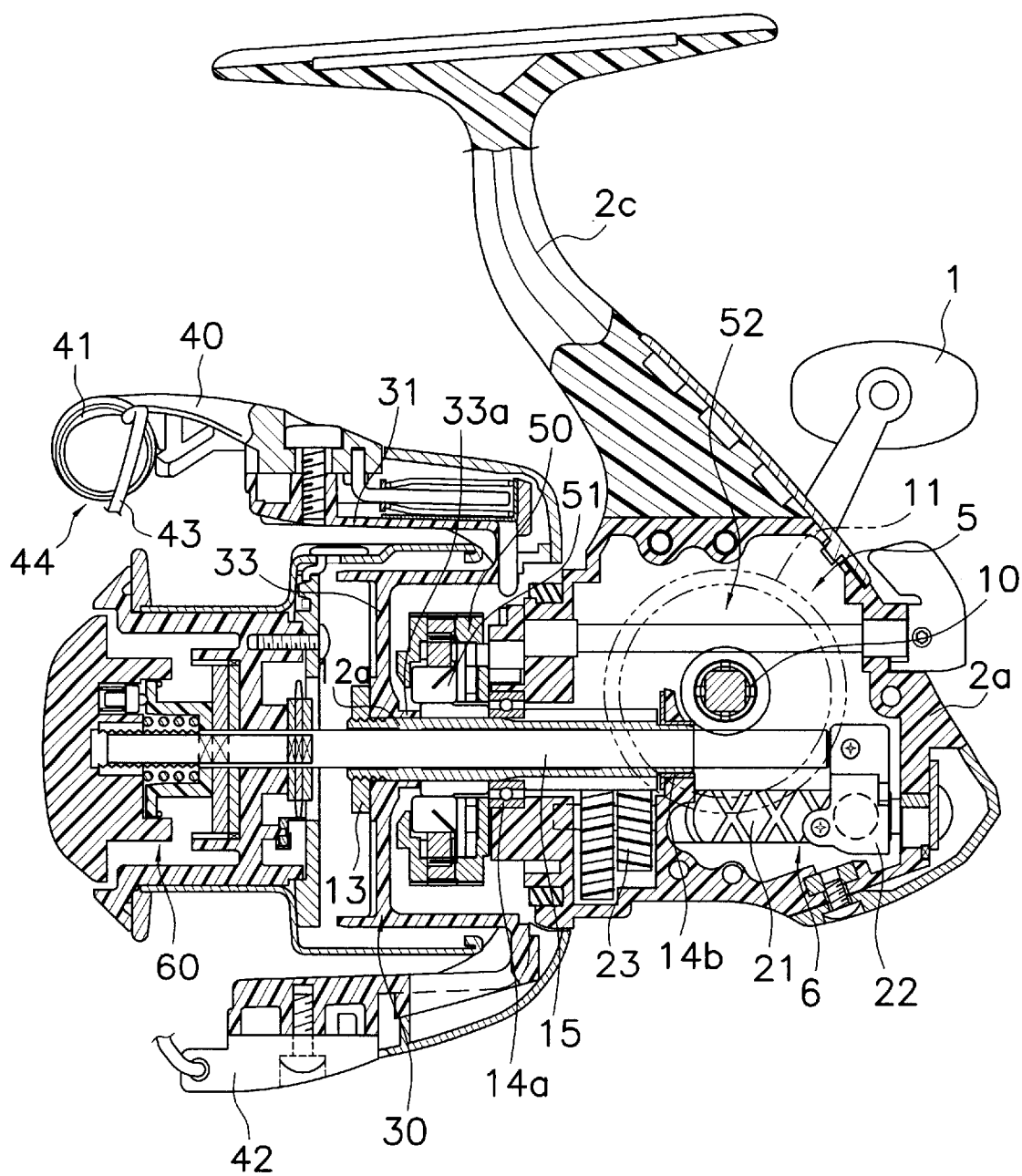

As shown in FIGS. 1 and 2, a spinning reel in accordance with an embodiment of the present invention includes a handle 1, a reel unit 2 rotatively supporting the handle 1, a rotor 3, and a spool 4. The rotor 3 is for winding the fishing line around the spool 4, and is rotatively supported at the front of the reel unit 2. The fishing line is wound around the outer peripheral surface of the spool 4, which is disposed at the front of the rotor 3 and can be shifted back and forth. It should be noted that the handle 1 can be attached to the left side of the reel unit 2 as shown in FIG. 1, or to the right side of the reel unit 2 as shown in FIG. 2.

The reel unit 2 includes a reel body 2a provided with an aperture, a lid member 2b mounted detachably to the reel body 2a so as to close the aperture, and a rod-attachment leg 2c extending diagonally up/frontward from the lid member 2b. In the interior of the reel body 2a is a hollow space, and installed within the hollow space are a rotor drive mechanism 5 that rotates the rotor 3 in cooperation with a rotation of the handle 1 and an oscillating mechanism 6 that shifts the spool 4 back and forth to wrap fishing line onto it uniformly.

The rotor drive mechanism 5 includes a face gear 11 that rotates together with a handle shaft 10 onto which the handle 1 is fastened, and a pinion gear 12 that meshes with the face gear 11. The pinion gear 12 is tubular, and its front portion 12a passes through the center portion of the rotor 3, to which it is fastened by a nut 13. The pinion gear 12 is rotatively supported in the reel unit 2 at the mid-portion and the rear end in the axial direction via respective bearings 14a and 14b.

The oscillating mechanism 6 is a mechanism for causing a spool shaft 15 linked to the center portion of the spool 4 via a drag mechanism 60 to shift back and forth, shifting the spool 4 in the same direction. The oscillating mechanism 6 has a worm 21 disposed below and parallel to the spool shaft 15, a slider 22 that travels back and forth along the worm 21, and an intermediate gear 23 affixed to the front end of the worm 21. The rear end of the spool shaft 15 is non-rotatably affixed to the slider 22. The intermediate gear 23 meshes with the pinion gear 12 via a (not illustrated) gear-down train. Thus, the speed with which the oscillating mechanism 6 shifts back and forth is slowed down, and the fishing line can be packed densely onto the spool 4.

Configuration of the Rotor

The rotor 3, as shown in FIG. 2, includes a cylindrical portion 30, and first and second rotor arms 31 and 32 opposing each other furnished on the sides of the cylindrical portion 30. The cylindrical portion 30 and the two rotor arms 31 and 32 are made of an aluminum alloy for example, and are formed in one piece.

A front wall 33 is provided at the front portion of the cylindrical portion 30. A boss portion 33a is formed in the middle of the front wall 33. A through hole is formed in the center of the boss portion 33a, and the front portion 12a of the pinion gear and the spool shaft 15 pass through this through hole. A nut 13 is arranged at the front portion of the front wall 33, and a bearing 35, which rotatively supports the spool shaft 15 is provided inside the nut 13.

The first rotor arm 31, curving in an outward bulge, extends frontward from the cylindrical portion 30, and the part joined with the cylindrical portion 30 is curved broadening in the circumferential direction of the cylindrical portion 30. A first bail-support member 40 is fitted pivotably onto the outer peripheral side of the front end of the first rotor arm 31. A line roller 41 for guiding fishing line onto the spool 4 is fitted to the front end of the first bail-support member 40.

The second rotor arm 32, curving in an outward bulge, extends frontward from the cylindrical portion 30. Heading from its tip toward the area where it joins with the cylindrical portion 30, the second rotor arm 32 branches into two legs, which are connected with the cylindrical portion 30 in two places spaced at a circumferential interval. A second bail-support member 42 is fitted pivotally onto the outer peripheral side of the front end of the second rotor arm 32.

A bail 43 of wire bent approximately into U-shaped is fastened between the line roller 41 and the second bail-support member 42. These first and second bail-support members 40 and 42, the line roller 41, and the bail 43 compose a bail arm 44 that guides fishing line onto the spool 4. The bail arm 44 is pivotable between a line-guiding posture, indicated in FIG. 2, and, when toppled over, a line-releasing posture.

A reverse rotation check mechanism 50 for blocking and releasing reverse rotation of the rotor 3 is provided inside the cylindrical portion 30 of the rotor 3. This reverse rotation check mechanism 50 has a roller-type one-way clutch 51 with a freely rotating inner ring, and a switching mechanism 52 that switches the one-way clutch 51 between an operating state (state in which reverse rotation is blocked) and a non-operating state (state in which reverse rotation is released).

Configuration of Spool

Figure 3:
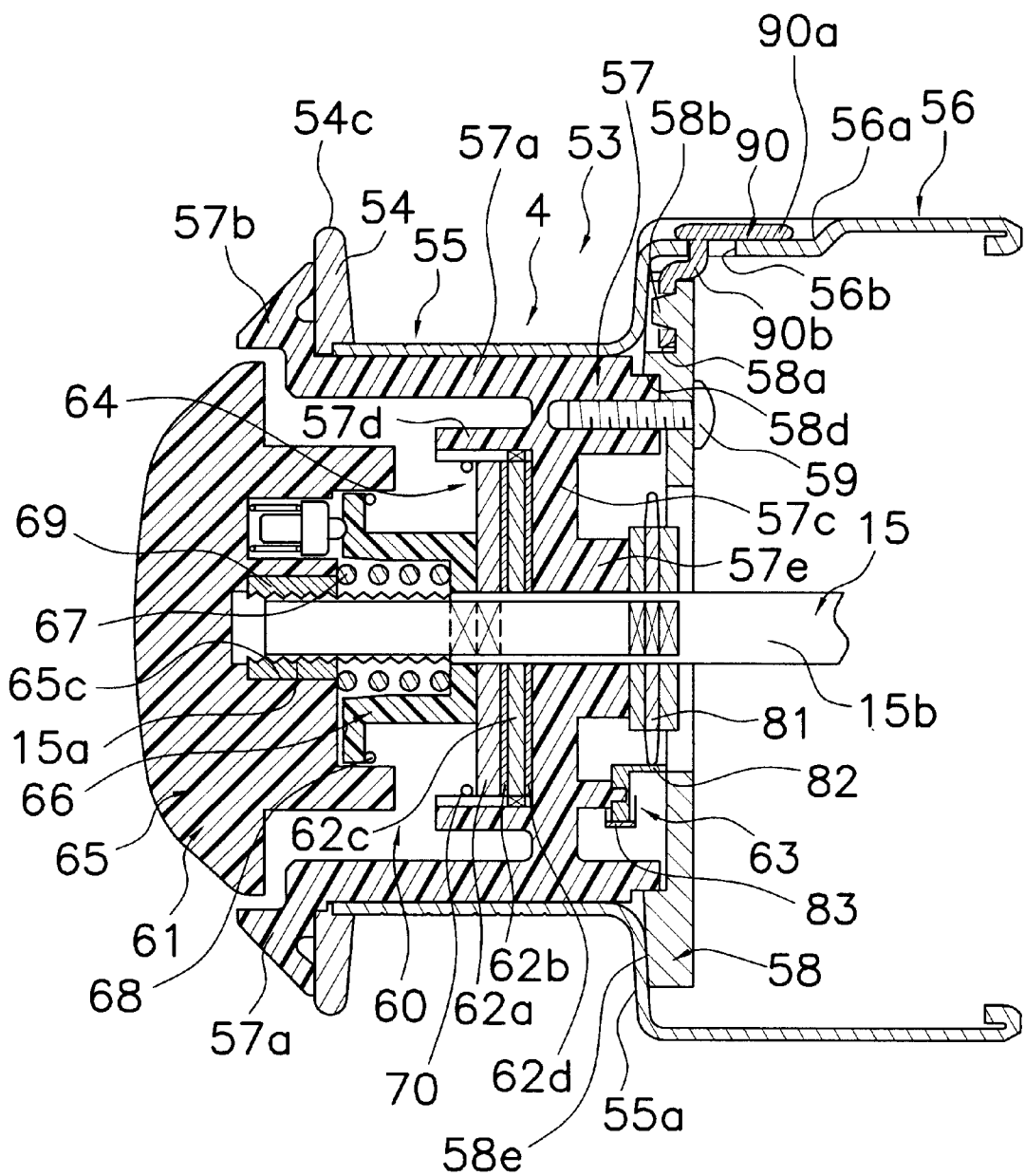
FIG. 3 is a magnified cross-sectional view of the spool portion of the spinning reel shown in FIG. 1.
Figure 4:
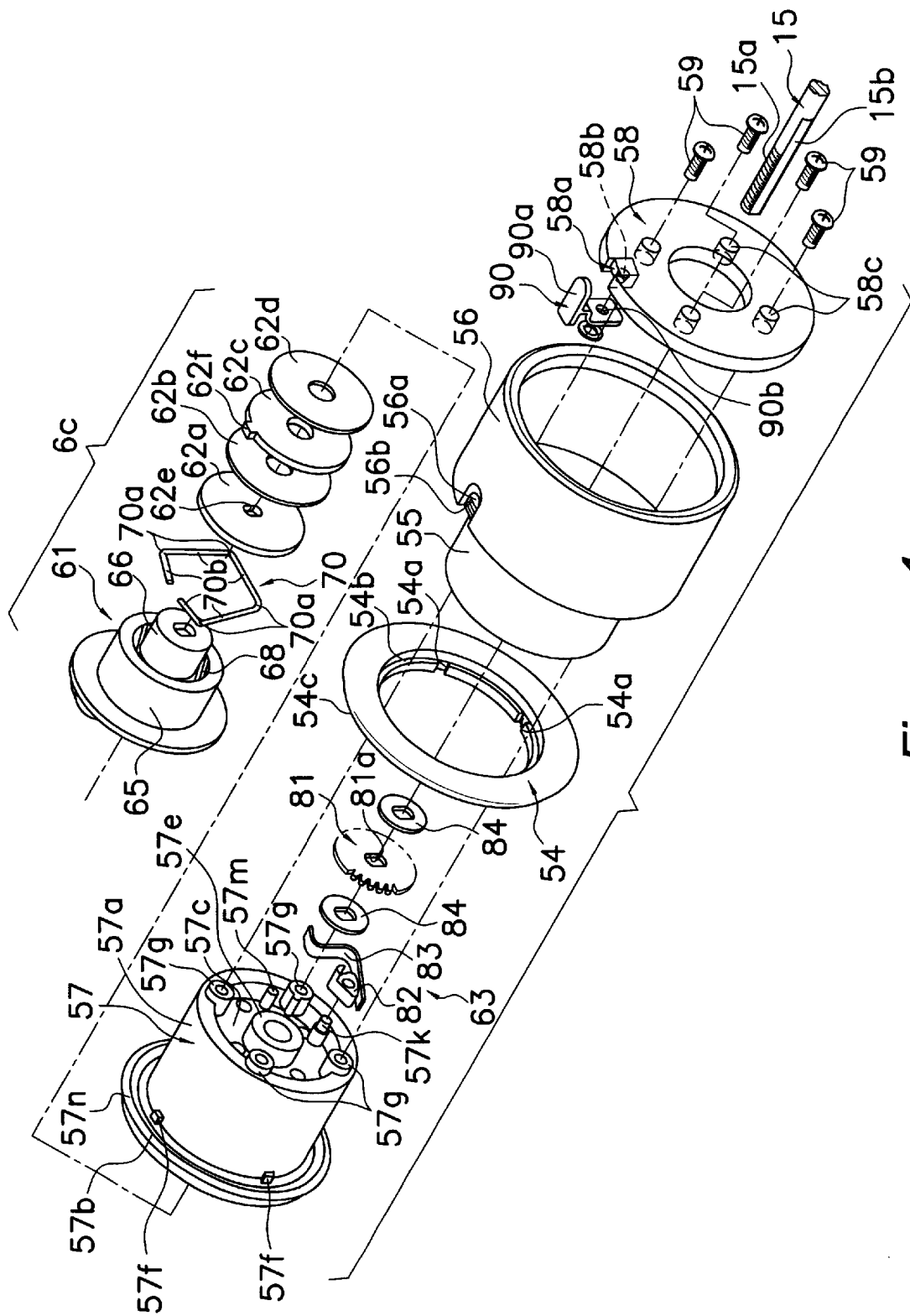
FIG. 4 is an exploded perspective view of the spool in accordance with the first embodiment.
Figure 5:
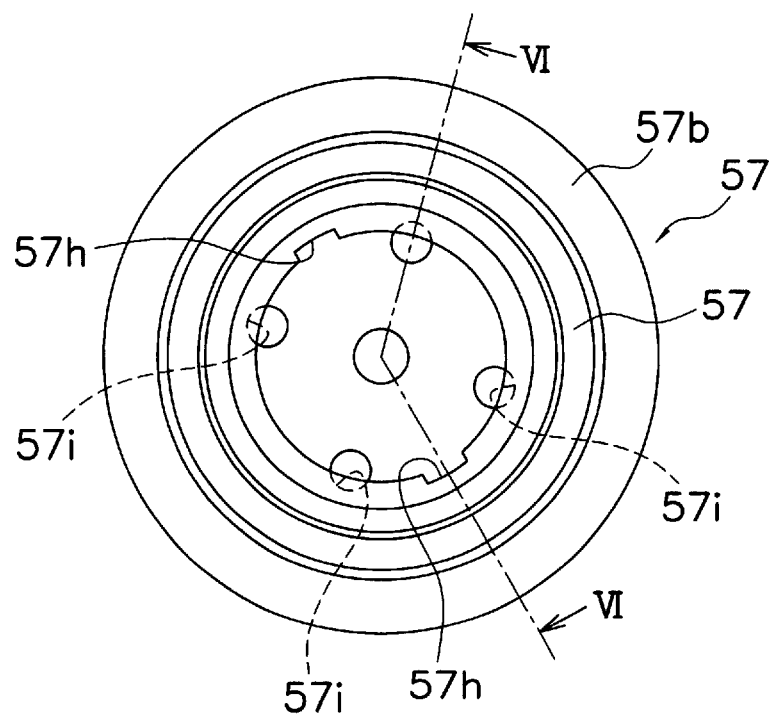
FIG. 5 is a front view of the spool in accordance with the first embodiment.
Figure 6:
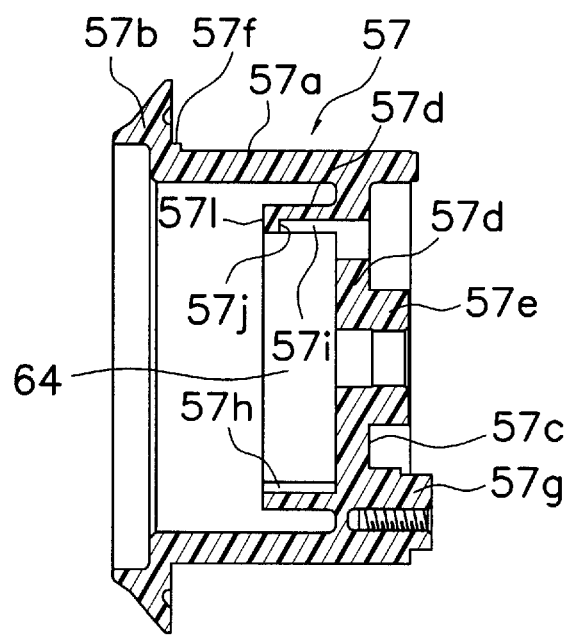
FIG. 6 is a cross-sectional view viewed along VI—VI in FIG. 5.

The spool 4 is arranged between the first rotor arm 31 and the second rotor arm 32 of the rotor 3, and is fastened to the front end of the spool shaft 15 with the drag mechanism 60 interposed between the spool shaft 15 and the spool 4. As shown in FIGS. 3 and 4, the spool 4 includes a main spool unit 53 and a front flange portion 54 that is attached to the front end of the main spool unit 53.

The main spool unit 53 includes a tubular bobbin trunk portion 55 for winding fishing line around its circumference, a tubular skirt portion 56 having a larger diameter and formed in one piece with the rear end of the bobbin trunk portion 55, an insert member 57 that is inserted into the bobbin trunk portion 55, and a fastening member 58 that fastens the bobbin trunk portion 55 to the insert member 57.

The bobbin trunk portion 55 and the skirt portion 56 are formed into one piece by press-forming a thin sheet of aluminum alloy for example, and constitute a tubular member having two levels of different diameters. The bobbin trunk portion 55 has a rear flange portion 55a, which extends outward in radial direction and is connected to the skirt portion. The fastening member 58 is arranged at the rear surface of the rear flange portion 55a.

The skirt portion 56 is folded over at its rear end for reinforcement, and a mounting cavity 56a for mounting a line holder 90 is formed in its peripheral surface at the front. The mounting cavity 56a is provided with a through hole 56b through which the line holder 90 is passed. The line holder 90 is made of a synthetic resin, and includes a plate-shaped line holding portion 90a for locking the fishing line and an attachment portion 90b extending inwards in the radial direction from the lower side of the line holding portion. The attachment portion 90b is attached to a line holder mounting portion 58a formed in the fastening member 58. The line holder mounting portion 58a is formed by slightly caving out the front and the outer circumference of the fastening member 58. The line holder mounting portion 58a is provided with a frustum-shaped protrusion 58b to which the line holder 90 is mounted.

As shown in FIGS. 3 to 6, the insert member 57 is a tubular member made of a synthetic resin that is inserted into the bobbin trunk portion 55 and accommodates the drag mechanism 60, and is made for example by injection molding. The insert member 57 includes an outer tubular portion 57a that is mounted to the bobbin trunk portion 55, a flange fastening portion 57b having a larger diameter formed at the front end of the outer tubular portion 57a, a wall portion 57c formed inward from the outer tubular portion 57a, an inner tubular portion 57d protruding frontward from the wall portion 57c on the inner side of the outer tubular portion 57a, and a tubular shaft-supporting portion 57e that is formed protruding rearwards from an inner portion of the wall portion 57c.

Figure 7:
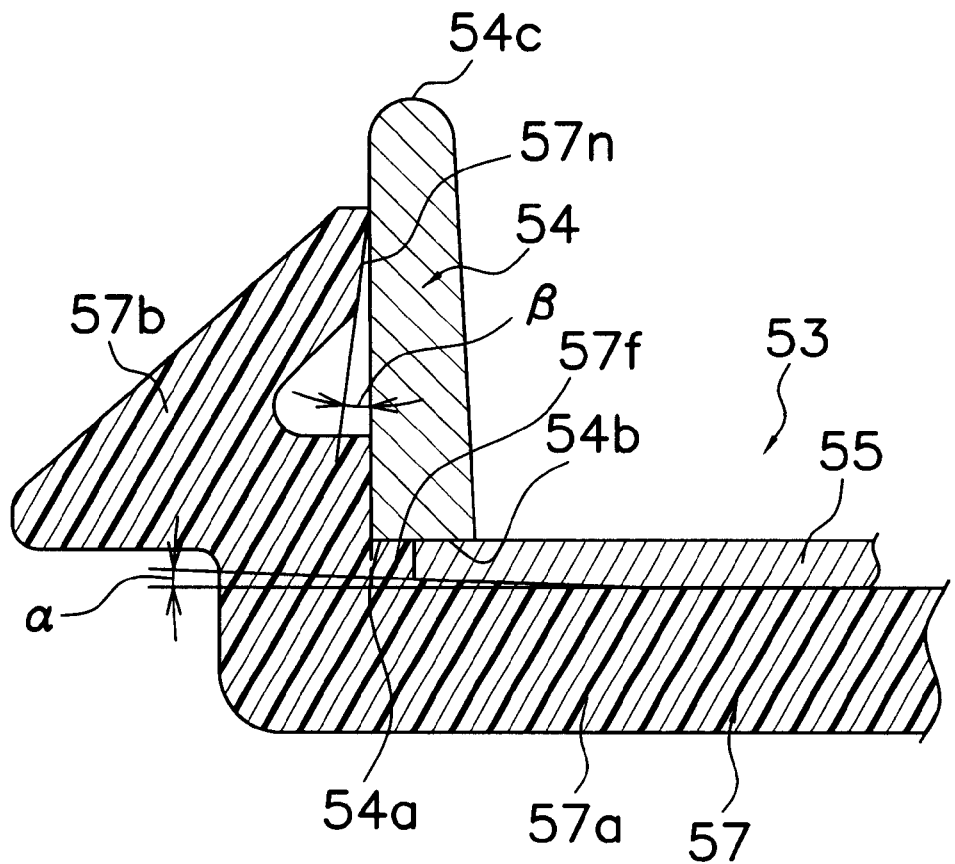
FIG. 7 is a magnified cross-sectional view of the front end portion of the spool in accordance with the first embodiment.

The base of the flange fastening portion 57b at the front of the outer tubular portion 57a is provided with four rotation-blocking protrusions 57f, arranged at a certain spacing in the circumferential direction and blocking the rotation of the front flange portion 54. Cut-outs 54a interlocking with these rotation-blocking protrusions 57f are provided on the inner peripheral side at the front of the front flange portion 54. Furthermore, as shown in FIG. 7, the outer peripheral surface at the front of the outer tubular portion 57a is a tapered surface that widens towards the front. The widening angle $\alpha$ is for example in the range of 1° to 5°. If the tapered surface is formed in this range, the bobbin trunk portion 55, which is made of thin-walled metal, can be press-fitted into the outer tubular portion 57a, so that there is no gap between the bobbin trunk portion 55 and the outer tubular portion 57a, and the fishing line can be prevented from becoming stuck in such a gap.

The flange fastening portion 57b is provided in order to hold the front flange portion 54 with the bobbin trunk portion 55. The rear surface of the flange fastening portion 57b is provided with a tapered surface 57n, such that it contacts the front surface of the flange portion 54 at a predetermined intersection angle $\beta$. Due to this tapered surface 57n, there is no gap between the flange fastening portion 57b and the front flange portion 54, so that fishing line can be prevented from becoming stuck in such a gap, and the outer appearance can be improved.

On the outer peripheral side at the rear of the wall portion 57c, four attachment bosses 57g extend from the outer tubular portion 57a and protrude to the rear. Attachment bolts 59 are screwed into these attachment bosses 57g, fastening the bobbin trunk portion 55 and the skirt portion 56 to the insert member 57. The wall portion 57c is further provided with a spring stop portion 57m and a mounting boss 57k for mounting a first sound-producing mechanism 63 (described further below) of the drag mechanism 60.

The inner side of the inner tubular portion 57d is a cylindrical member with end faces 57l. A cylindrical concave portion 64 for accommodating the drag mechanism 60 is formed on one of the end faces 57l (on the left side in FIG. 6). This inner circumferential surface of the inner tubular portion 57d is provided with a pair of first interlocking grooves 57h. for checking rotation of the drag mechanism 60. The first interlocking grooves 57h have a rectangular cross section, and are formed in parallel to the spool shaft 15 at opposing positions in the radial direction. The inner side of the inner tubular portion 57d is further provided with four second interlocking grooves 57i for retaining the drag mechanism 60. The second interlocking grooves 57i are arranged at a certain spacing in the circumferential direction. The second interlocking grooves 57i are provided with a substantially semi-circular cross section by forming round holes passing from the wall portion 57c side parallel to the spool shaft 15 through the wall portion 57c and through the inner circumferential wall (outer edge of the concave portion 64). The second interlocking grooves 57i are formed only up to a position short of the front end of the inner tubular portion 57d. The retaining spring 70 (explained further below) is interlocked at these groove ends 57j on the front surface side.

The fastening member 58 is a circular plate made of a synthetic resin, and is provided with four through holes 58c through which the attachment bolts 59 are passed. It is further provided with a stepped concave portion 58d centered on the rear side of the insert member 57. A pressing surface 58e that is slightly sloped convexly to the front in adaptation to the slope of the rear flange portion 55a is formed on the front side of the fastening member 58. The fastening member 58 is mounted with the attachment bolts 59 to the rear face of the insert member 57 in a centered position. The pressing surface 58e is pressed against the rear flange portion 55a so as to fasten the bobbin trunk portion 55 to the insert member 57. The front flange portion 54 is pressed by the bobbin trunk portion 55 toward the flange fastening portion 57b, thus fixing the front flange portion 54.

The front flange portion 54 is for example a ring-shaped member made of an aluminum alloy, which is formed by first punch-pressing and then cutting a plate-shaped metal thin sheet. As shown in FIG. 7, the outer peripheral surface 54c of the front flange portion 54 is rounded by machining to a circular cross section. The inner peripheral surface of the front flange portion 54 is provided with the above-mentioned cut-outs 54a and an annular abutting concave portion 54b that is formed such that a front surface of the bobbin trunk portion 55 abuts against the rear face of the cut-outs 54a. These cut-outs 54a and the abutting concave portion 54b are formed at the time of the punching process. The front flange portion 54 is fastened to the insert member 57 by fastening the bobbin trunk portion 55 and the skirt portion 56 to the insert member 57. That is to say, by fastening the bobbin trunk portion 55 to the insert member 57 with the bobbin trunk portion 55 pressed toward the front flange portion 54, the front flange portion 54 is held between the bobbin portion 55 and the flange fastening portion 57b, thereby fastening the front flange portion 54.

Configuration of the Drag Mechanism

As shown in FIGS. 3 and 4, the drag mechanism 60 is disposed inside the concave portion 64 of the inner tubular portion 57d of the insert member 57. The drag mechanism 60 is a mechanism for applying a drag force to the spool 4 by braking the rotation of the spool 4 in the direction reeling off the fishing line. The drag mechanism 60 includes a drag knob 61 that is screwed to the front end of the spool shaft 15, four drag disks 62a to 62d that are pressed together by the drag knob 61, and a first sound-producing mechanism 63 that produces a sound when drag is applied.

Figure 8:
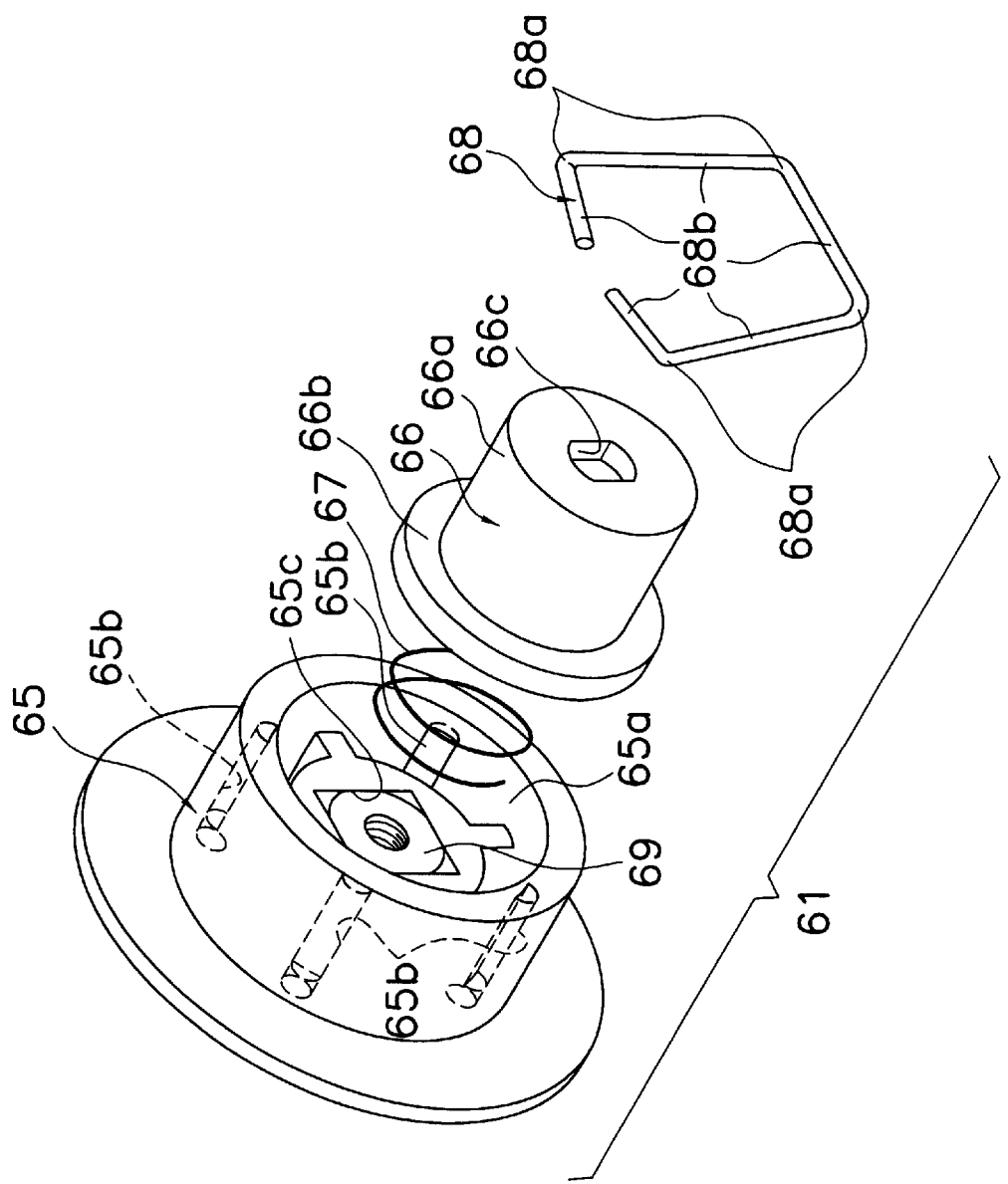
FIG. 8 is an exploded perspective view of the drag knob in accordance with the first embodiment.
Figure 9:
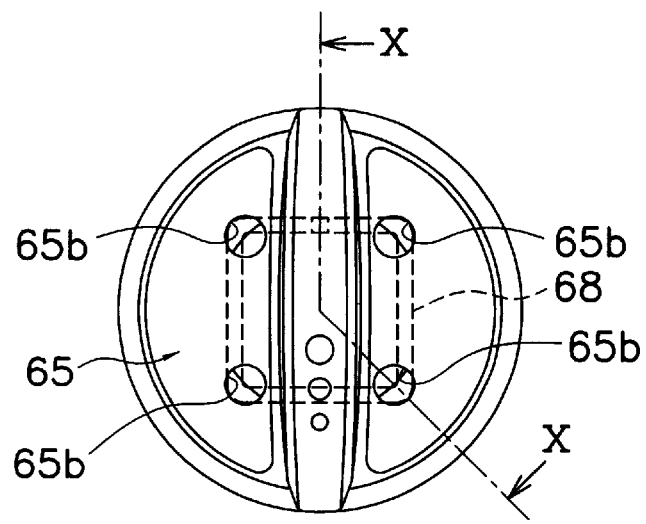
FIG. 9 is a front view of the drag knob in accordance with the first embodiment.
Figure 10:
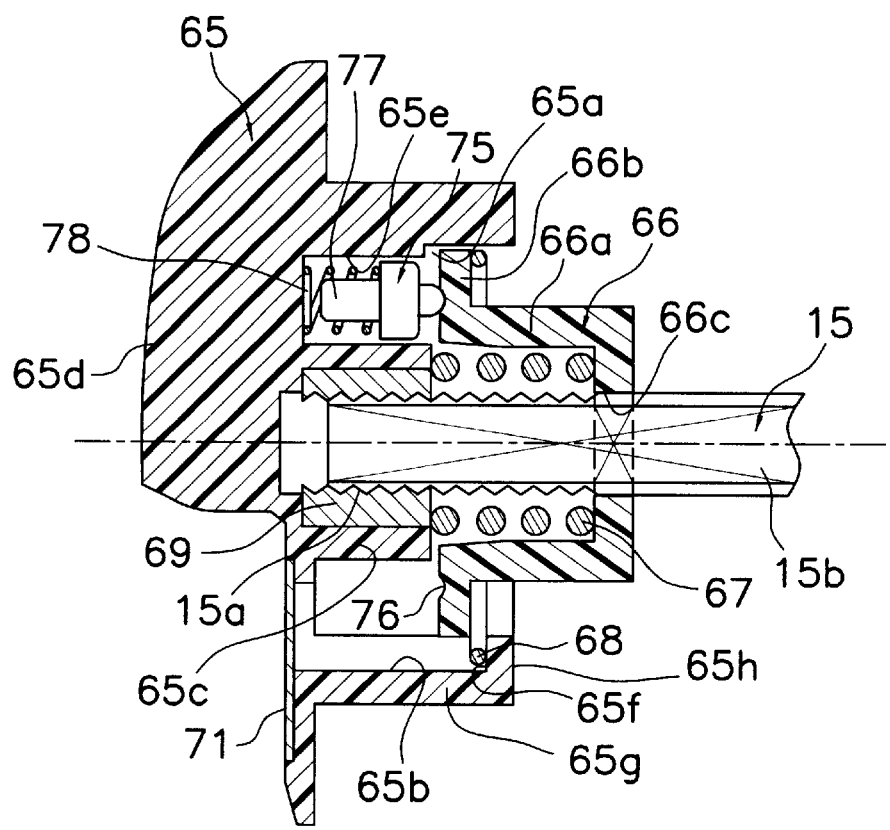
FIG. 10 is a cross-sectional view taken along X—X in FIG. 9.

As shown in FIGS. 8 to 10, the drag knob 61 is made of a main knob unit 65 for manually performing the adjustment of the drag force, a presser unit 66 pressed down by the main knob unit 65, a coil spring 67 arranged between the main knob unit 65 and the presser unit 66, a retaining spring 68 for retaining the presser unit 66 with respect to the main knob unit 65, and a second sound-producing mechanism 75 that produces a sound when the drag is adjusted.

The main knob unit 65 has a circular concave portion 65a provided with an aperture on its rear side, and four interlocking grooves 65b that are formed at a certain spacing in circumferential direction and extending along the spool shaft direction from the front surface up to a position short of the rear surface of the circular concave portion 65a through its outer edge. The main knob unit 65 is a brimmed cylindrical member made of synthetic resin by injection molding for example. The interlocking grooves 65b, which are formed by round holes formed from the front surface, are semi-circular at the outer edge of the concave portion 65a, and are formed to a position short of the rear end of the concave portion 65a. The retaining spring 68 interlocks with the groove ends 65f of the interlocking grooves 65b, such that the corner portions 68a protrude beyond the outer periphery of the presser unit 66. The round holes for forming the interlocking grooves 65b are hidden by a seal 71 that is glued to the front surface of the main knob unit 65. Since the round holes are closed by gluing the seal 71, water or other foreign matter are kept from intruding even though the interlocking grooves 65b are formed as round holes by die forming.

The center of the main knob unit 65 is provided with a cylindrical portion 65g with end faces 65h on both axial ends, and a nut mounting portion 65c for mounting a quadrilateral nut 69 that is non-rotatable and axially shiftable with respect to the nut mounting portion 65c. The front portion of the main knob unit 65 is provided with a substantially trapezoidal knob protrusion 65d formed along the diameter of the main knob unit 65. The rear surface of the main knob unit 65 is provided with a mounting hole 65e for accommodating the second sound-producing mechanism 75. The nut 69 is screwed to a male threaded portion 15a formed at the front end of the spool shaft 15. The coil spring 67 is mounted in its compressed state between the nut 69 and the presser unit 66.

The presser unit 66 is linked to the main knob unit 65 so as to be rotatable but not shiftable in the axial direction. The presser unit 66 is not rotatable with respect to the spool shaft 15. Touching the rear end of the coil spring 67, the presser unit 66 imparts a pressing force on the drag disks 62a to 62d that changes in accordance with the changes in the spring force of the coil spring 67. The presser unit 66 is a brimmed tubular member that is provided with a bottom on one side and includes a cylindrical portion (guide portion) 66a and a ring-shaped brim portion 66b whose diameter is larger than that of the cylindrical portion 66a. The inner circumference of the cylindrical portion 66a is provided with an interlocking hole 66c shaped like an oblong groove that interlocks non-rotatably with parallel chamfered portions 15b formed at the front end of the spool shaft 15. The coil spring 67 is accommodated inside the cylindrical portion 66a. A multitude of semi-spherical sound-making holes 76 are formed in a row in the circumferential direction at the front surface of the brim portion 66b. The presser unit 66 is linked by the retaining spring 68 to the main knob unit 65.

The coil spring 67 is mounted in its compressed state between the nut 69 and the presser unit 66. More specifically, guided by the cylindrical portion 66a of the presser unit 66, the coil spring 67 is disposed so that it touches the nut 69 and the bottom portion of the cylindrical portion 66a.

The retaining spring 68 is formed by bending a metal piece of wire having elasticity. The retaining spring 68 is formed so that it is compressed and becomes quadrilateral when mounted, and so that it widens slightly when not mounted. The corner portions 68a of this quadrilateral interlock with the groove ends 65f of the interlocking grooves 65b and the contact portions 68b linking the corner portions 68a contact the presser unit 66 on the rear side of the brim portion 66b. Thus, the presser unit 66 is accommodated such that it is retained in the concave portion 65a.

The second sound-producing mechanism 75 includes the sound-making holes 76 in the presser unit 66, a sound-making pin 77 mounted in the mounting hole 65e, and a coil spring 78 that urges the sound-making pin 77 towards the sound-making holes 76. The sound-making holes 76 are provided in a large number at a certain spacing in the circumferential direction at positions that can be brought into opposition with the mounting hole 65e. The center portion of the sound-making pin 77 has a large diameter whereas its tip and rear end have a small diameter. The tip of the sound-making pin 77 is rounded to define a semisphere. When the main knob unit 65 and the presser unit 66 are rotated against one another during adjustment of the drag, the repeated collision of the sound-making pin 77 with the sound-making holes 76 produces a sound.

As shown in FIG. 4, the drag disk 62a, which is in contact with the presser unit 66, is a disk-shaped member made of metal, and is non-rotatable with respect to the spool shaft 15. The drag disk 62b is a disk-shaped member made for example of felt, and is freely rotatable with respect to the spool 4 and the spool shaft 15. The drag disk 62c is a disk-shaped member made of metal, and is non-rotatable with respect to the spool 4. The drag disk 62d is a disk-shaped member made for example of felt, and is freely rotatable with respect to the spool 4 and the spool shaft 15. The center of the drag disk 62a is provided with an interlocking hole 62e shaped like an oblong groove that engages with chamfered portions 15b of the spool shaft 15. On the outer circumferential surface of the drag disk 62c, a pair of ear portions 62f protruding outward in radial direction are formed, which interlock with the first interlocking grooves 57h of the spool 4. Thus, the drag disk 62c is arranged non-rotatably with respect to the spool 4.

The front side of the drag disk 62b is in contact with the retaining spring 70. The retaining spring 70 is quadrilateral like the retaining spring 68, and its corner portions 70a interlock with the groove ends 57j of the second interlocking grooves 57i, such that the corner portions 70a protrude beyond the outer periphery of the drag disk 62b. The contact portions 70b are in contact with the drag disk 62a, thus retaining the drag disks 62a to 62d. Thus, the drag disks 62a to 62d are kept from falling off even when the drag knob 61 is removed.

Figure 11:
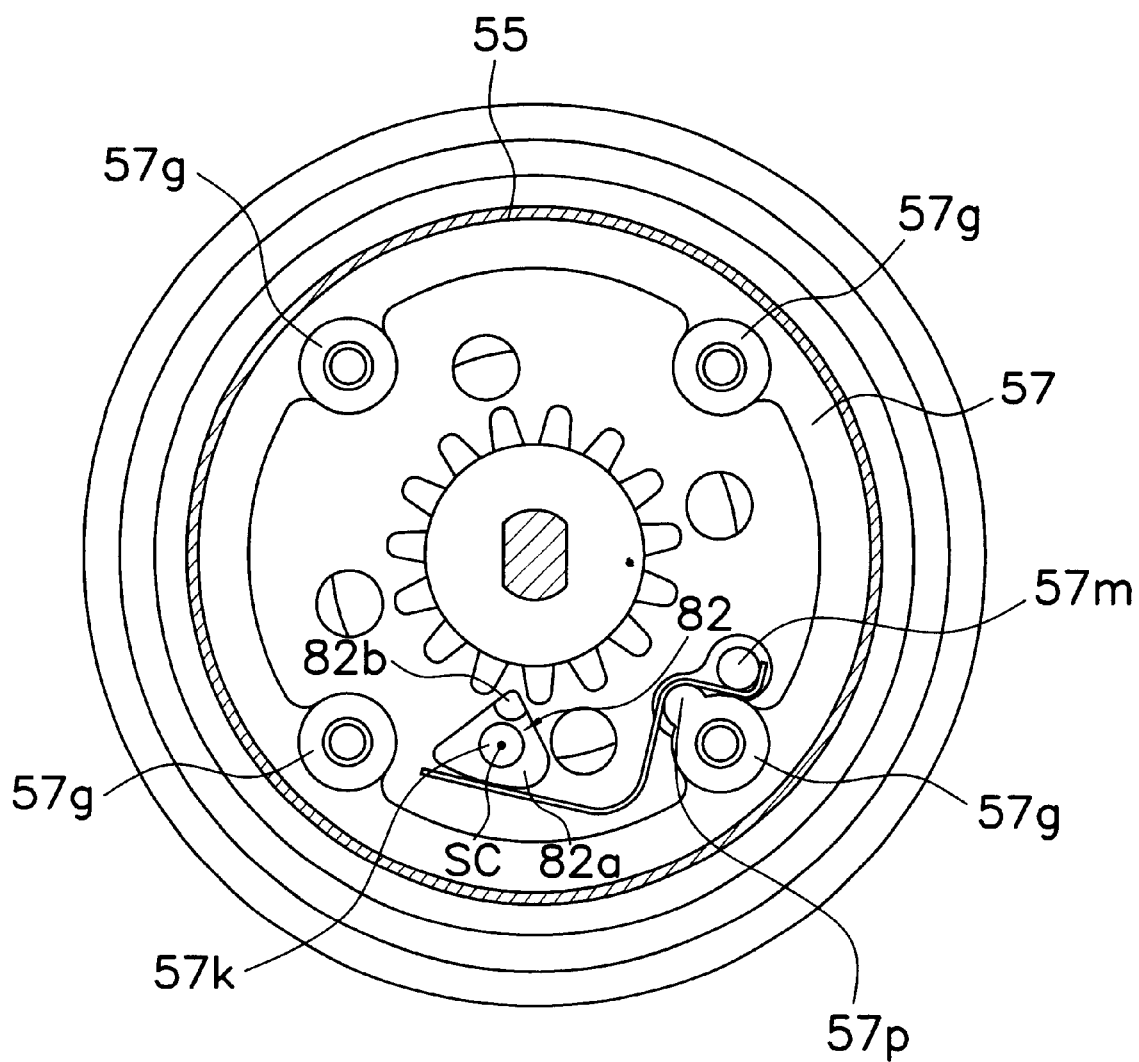
FIG. 11 is an overall view of the first sound-producing mechanism provided on the back side of the spool in accordance with the first embodiment.

The first sound-producing mechanism 63 produces a sound when the spool shaft 15 and the spool 4 are rotated against one another under the application of drag. As shown in FIGS. 3, 4 and 11, the first sound-producing mechanism 63 includes a sound-producing member 81 that is mounted non-rotatably to the spool shaft 15, a pawl member 82 that is mounted pivotably to the insert member 57 and that repeatedly collides with the sound-making member 81, and a plate spring 83 that energizes the pawl member 82.

The sound-producing member 81 has an interlocking hole 81a shaped like an oblong groove, which is interlocked with the chamfered portion 15b of the spool shaft 15. The sound-making member 81 is a disk-shaped member that is shaped like a gear having a multitude of protrusions 81b (see FIG. 12) that are arranged at a certain spacing in the circumferential direction and are protruding outward from the outer circumference. Spool washers 84 for adjusting the horizontal position of the spool 4 are mounted on both sides of the sound-making member 81. The spool washers 84 are mounted non-rotatably to the spool shaft 15, and the horizontal position of the spool 4 can be changed by changing the number of those spool washers 84, so that the line-winding shape on the spool 4 can be adjusted freely.

Figure 12:
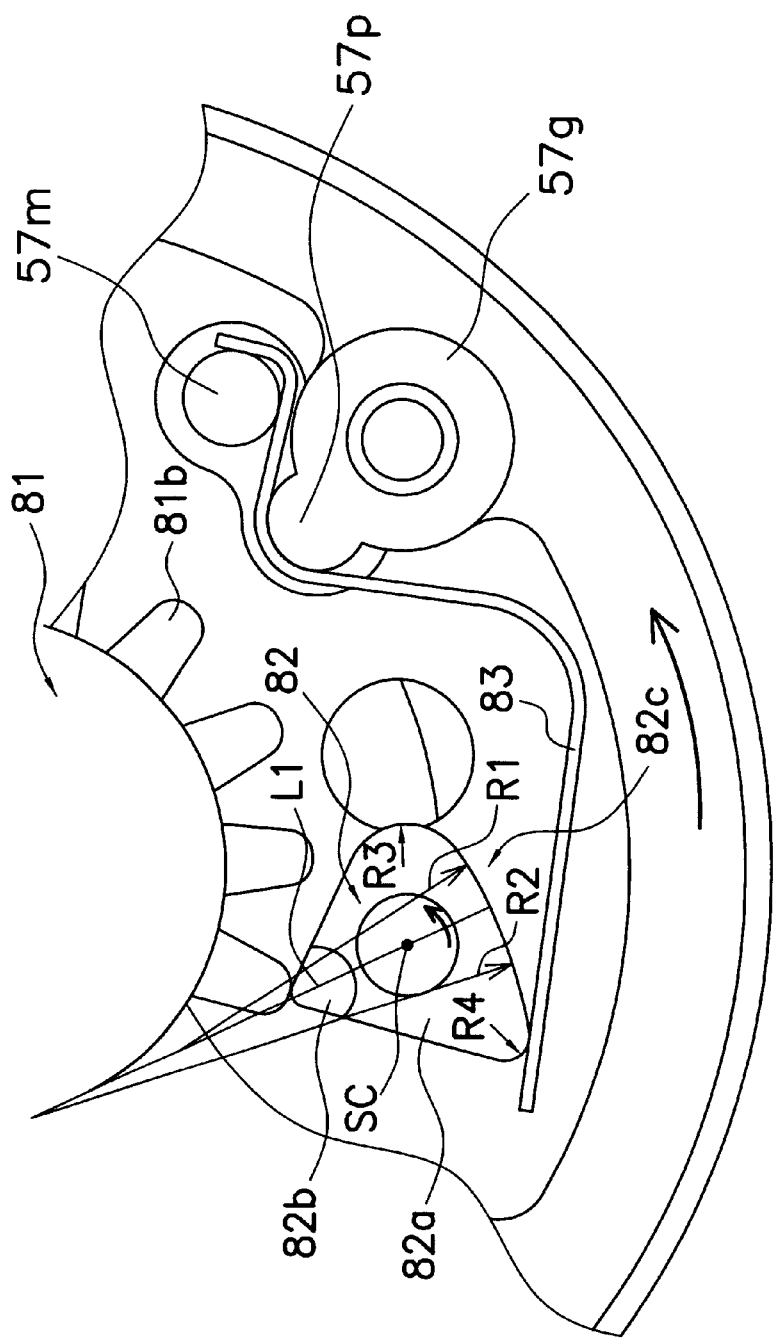
FIG. 12 is a magnified partial view of the sound-producing mechanism in accordance with the first embodiment.

As shown in FIG. 12, the pawl member 82 includes a main unit 82a that is mounted pivotably to the insert member 57 of the spool 4, a pawl portion 82b that collides with the protrusions and recesses 81b of the sound-making member 81, and a contact face 82c that contacts the plate spring 83. The pawl portion 82b is formed closer to the spool shaft 15 than the pivoting center SC of the main unit 82a. The length of the pawl portion 82b in the spool shaft direction is greater than that of the other portions. The contact face 82c is formed arc-shaped on the main unit 82a on a side of the pivoting center SC opposite from the spool shaft 15. Where a straight line L1 is drawn connecting the pivoting center SC and the pawl portion 82b, a radius R1 of the arc of the contact face 82c on a first side (the right-hand side in FIG. 12) is smaller than a radius R2 of the arc of the contact face 82c on a second side (the left-hand side in FIG. 12). The corner portions on both sides of the contact face 82c are rounded, and the rounding radius R3 on the first side is larger than the rounding radius R4 on the second side.

Held by the spring lock portion 57m and one of the attachment bosses 57g, the plate spring 83 is mounted to the insert member 57. The plate spring 83 contacts the pawl member 82 with a portion that is slightly arched with a radius that is different from that of the main unit 82a. The plate spring 83 urges the pawl member 82 toward the sound-making member 81. More specifically, the pawl member 82 is disposed such that the corner portion with the larger radius is positioned on a side where the plate spring 83 is mounted. The plate spring 83 is a plate-shaped member made of metal that is bent back and forth at three locations to form a zigzag shape. An end of the plate spring 83 close to the first side of the contact face 82 is mounted to the insert member 57 of the spool 4. More specifically, the plate spring 83 is clamped between the spring lock portion 57m and the mounting boss 57g, and is bent over at a protrusion 57p, which formed in the mounting boss 57g. Then, the plate spring 83 is bent again in the opposite direction, and contacts the contact face 82 from the first side. Then, the plate spring 83 urges the pawl portion 82b of the pawl member 82 into a collision posture, in which the pawl portion 82b collides with the sound-making ember 81. That is to say, a point on the contact face 82c, whose distance from the pivoting center SC is shortest, lies on the boundary defined by the straight line L1, and going from there to the first side or the second side, that distance becomes longer. The proportion with which the distance becomes longer is smaller on the first side than on the second side, because the radius R1 is smaller than the radius R2 and the radius R3 is larger than the radius R4. Therefore, when the plate spring 83 is pressed down by the contact face 82c of the pawl member 82, the plate spring 83 urges the pawl member 82 back so as to contact the contact face 82c at the boundary portion at which the pawl portion 82b contacts the sound-making member 81, so that the pawl member 82 is put into the collision posture.

Figure 13:
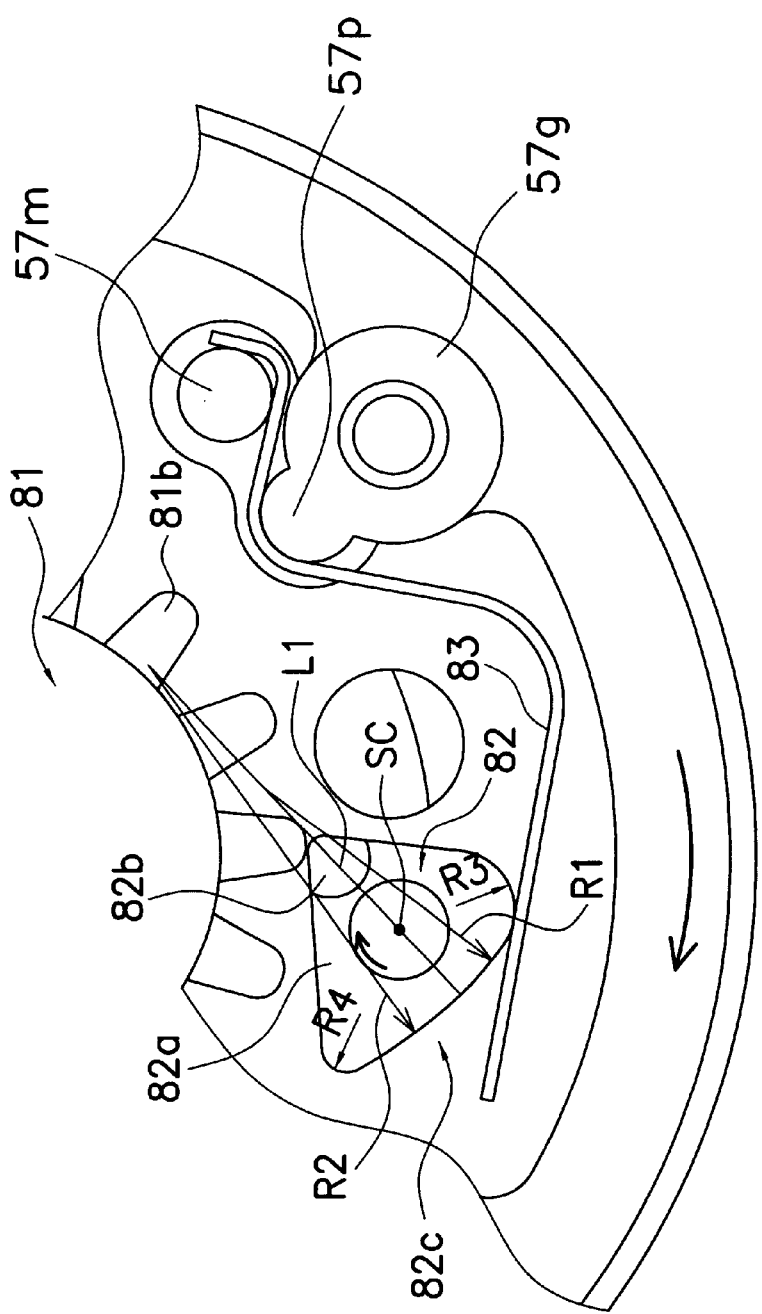
FIG. 13 is a magnified partial view of the sound-producing mechanism in accordance with the first embodiment.

When the pawl member 82 and the plate spring 83 are arranged in this manner, the force with which the pawl member 82 presses the plate spring 83 tends not to fluctuate, regardless of the rotation direction of the spool 4. This is due to the following reason. The displacement of the plate spring 83 occurs due to the contact with the protrusion 57p. Therefore, if the radius of the contact portion 82c of the pawl member 82 were the same on both the first and second sides, the displacement of the plate spring 83 would be greater on the first side, where the pawl member 82 pivots clockwise as shown in FIG. 13, than that on the second side, where the pawl member 82 pivots counterclockwise as shown in FIG. 12, since the first side is closer to the mounting portion of the plate spring 83. Thus, in order to reduce the displacement of the plate spring 83 when the pawl member 82 is pivoting clockwise, the radius R1 on the first side is made smaller than the radius R2 on the second side, and the rounding radius R3 is made larger than the radius R4. Therefore, there tends to be no difference in the pressure applied from the pawl member 82 to the plate spring 83, and hence the displacement of the plate spring 83, depending on the rotation direction of the spool 4. Accordingly, there is little difference in the sound produced by the pawl member 82 in both rotation direction of the spool 4. Furthermore, since the pawl portion 82b extends in the direction of the spool shaft 15, the pawl portion 82b always comes into contact with the sound-making member 81, even when the position of the spool 4 is adjusted with the spool washers 84.

Handling and Operation of the Reel

Before casting, the drag force is adjusted in accordance with the size and species of fish. To adjust the drag force, the drag knob 61 is turned. When the drag knob 61 is turned for example clockwise, then the nut 69, which is screwed to the spool shaft 15, presses the presser unit 66 against the drag disk 62a via the coil spring 67. This increases the drag force. Due to the relative rotation of the presser unit 66 and the main knob unit 65, the sound-making pin 77 of the second sound-producing mechanism 75 repeatedly collides with the sound-making holes 76 at predetermined intervals, producing a crisply buzzing clicking sound.

When casting, the bail arm 44 is toppled over to the line-releasing posture. Thus, the first bail supporting member 40 and the second bail supporting member 42 are pivoted. In this situation, the fishing rod is cast while holding the fishing line with the index finger of the hand with which the fishing rod is held. Thus, fishing line is released with high momentum due to the weight of the tackle. When the handle 1 is turned in the line-winding direction, the rotor 3 rotates in the line-winding direction due to the rotor drive mechanism 5, and the bail tripping mechanism restores the bail arm 44 into the line-winding posture, so that the fishing line is wound onto the spool 4.

When in this situation a fish is caught and drag is applied, then the spool 4 rotates with respect to the spool shaft 15. At this point, the first sound-producing mechanism 63 produces a sound, thereby letting the fisherman know that a fish has been caught. Then, the spool 4 rotates in the direction unreeling line with a predetermined drag force. When a sound is produced by the first sound-producing mechanism 63 during the drag application, then the spool 4 rotates counterclockwise when viewed from the rear, as shown in FIG. 12., so that the plate spring 83 contacts the contact face 82 on the second side. When the spool 4 is manually rotated in the line-winding direction, then the spool 4 rotates clockwise when viewed from the rear, as shown in FIG. 13. In conventional art, when the rotation directions of the spool 4 are different like this, the displacement of the plate spring 83 changes depending on the pivoting direction of the pawl member 82, since a greater amount of displacement of the plate spring 83 is caused on the first side by the same amount of pressure than on the second side. Accordingly, different tones are produced. In this embodiment of the invention, however, the radius R1 and the rounding radius R3 on the first side, which is closer to the mounting side of the plate spring 83, are made smaller and larger respectively, than the counterpart radii on the second side. Therefore, the amount of displacement of the plate spring 83 caused by the same amount of pressure from the pawl member 82 is smaller on the first side than on the second side. Accordingly, there is little difference, between the first and the second side, in the displacement of the plate spring 83 with respect to the same amount of pivoting of the pawl member 82. Therefore, the spring force of the plate spring 83 tends not to fluctuate. Thus, the tone of the sound-producing mechanism 3 is unchanged, regardless of the rotation direction of the spool.

Sometimes, before fishing, the fisherman prepares a plurality of spools 4 with different kinds of fishing line, and changes the spool 4 in accordance with the catch. To do so, the drag knob 61 is loosened and removed from the spool shaft 15. In this situation, the presser unit 66 is linked to the main knob unit 65 by the retaining spring 68, so that the presser unit 66 does not fall off from the main knob unit 65. Furthermore, the drag disks 62a to 62d are retained by the retaining spring 70, so that they do not fall off from the spool 4.

In the conventional art, such retaining springs 68 and 70 are used to interlock with annular groove portions formed by a machining process. Therefore, it was necessary to perform a machining process to form these groove portions. However in the present embodiment, the retaining springs 70 and 68 interlock with the interlocking grooves 57i and 65b formed by a die when die-casting the insert member 57 and the main knob unit 65, so that interlocking can be achieved without having to perform machining. Thus, the processing costs can be reduced.

OTHER EMBODIMENTS (a) The above-described embodiment was explained taking the spool and the drag disks of a spinning reel or the main knob unit and the presser as examples of component assemblies. The present invention is not, however, limited to these examples. The present invention can be applied to component assemblies for any fishing reel. For example, the present invention can also be applied to retaining structures for one-way clutches or sealing members of fishing reels.

(b) In the above-described embodiment, a retaining spring was formed into a retaining member by bending a wire into a quadrilateral. The retaining spring can also be formed into any other polygon, such as a triangle or a pentagon. Furthermore, instead of a polygon, the retaining spring may also be bent into a shape where protrusions are formed only at the portions interlocking with the interlocking grooves.

(c) In the above-described embodiment, a metal wire was bent to form the retaining members, but it is also possible to use any other material, such as molded synthetic resin, as long as it has elasticity.

With the present invention, the structure for interlocking with the retaining member can be formed by die-casting, so that the interlocking structure of the retaining member can be achieved without having to perform a machining process. Accordingly, the processing costs can be reduced.

As used herein, the following directional terms "forward," "rearward," "above," "downward," "vertical," "horizontal," "below" and "transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-13291. The entire disclosure of Japanese Patent Application No. 2002-13291 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A component assembly for use in a fishing reel, comprising:
    a first component including
        a body extending along an axis and having first and second end faces at opposite ends of the axis,
        a cylindrical concave portion formed on said first end face, and
        a plurality of interlocking grooves that is formed on an inner surface of said cylindrical concave portion and opens to said second end face, said plurality of interlocking grooves extending in a direction of the axis of said body up to a groove end which is formed on an axial opposite side of said first end face, said plurality of interlocking grooves being formed at a certain spacing in a circumferential direction;
    a second component at least a portion of which is accommodated in said cylindrical concave portion; and
    a retaining member that can be inserted into said cylindrical concave portion from a first-end-face side, said retaining member having
        a plurality of engagement portions that can interlock with said plurality of interlocking grooves such that said second component is retained in said cylindrical concave portion, and
        a plurality of contact portions that is formed in one piece with said plurality of engagement portions and can contact said second component from the first-end-face side.

2. The component assembly of a fishing reel as set forth in claim 1, wherein said retaining member is formed by bending an elastic wire, said plurality of engagement portions is protruding beyond an outer peripheral surface of said second component when said engagement portions are interlocked with said interlocking grooves, and said plurality of contact portions is linking said plurality of protruding engagement portions.

3. The component assembly of a fishing reel as set forth in claim 2, wherein said retaining member is formed by bending a wire into a polygon, said engagement portions are corner portions of the polygon, and said contact portions are straight portions linking said corner portions.

4. The component assembly of a fishing reel as set forth in claim 1, wherein said second component is coupled to said first component so as to be rotatable with respect to said first component.

5. The component assembly of a fishing reel as set forth in claim 4, wherein said first component is a main knob unit of a drag knob for adjusting drag force of a drag mechanism, said main knob unit having said body portion and said cylindrical concave portion that is screwed to a front end of a spool shaft of a spinning reel; and said second component is a presser member for pressing against a drag disk of the drag mechanism, at least a portion of said presser member being accommodated in said cylindrical concave portion.

6. The component assembly of a fishing reel as set forth in claim 5, further comprising a spring member urging said presser member and said main knob unit away from one another, said main knob unit including
 a nut portion that is screwed to the spool shaft, and
 a nut accommodating portion that is formed at a center portion of said cylindrical concave portion and accommodates said nut portion such that said nut is non-rotatable and axially shiftable relative to said nut accommodating portion.

7. The component assembly of a fishing reel as set forth in claim 6, wherein said presser member has a tubular guide portion provided with a bottom that is mounted non-rotatably to the spool shaft, and a brim portion whose diameter is larger than that of said guide portion;

said brim portion is accommodated in said main knob unit; and said spring member is mounted to an inner side of said guide portion.

8. The component assembly of a fishing reel as set forth in claim 1, wherein said second component is unrotatably coupled to said first component.

9. The component assembly of a fishing reel as set forth in claim 1, wherein said first component is a spool that is mounted via a drag mechanism to a front portion of a spool shaft of a spinning reel and has said concave portion; and said second component includes at least one drag disk that is accommodated in said cylindrical concave portion and is a part of the drag mechanism.

10. The component assembly of a fishing reel as set forth in claim 9, wherein said spool has an inner tubular portion, which is said body, said inner tubular portion has said cylindrical concave portion on its rear end face, said drag disk being accommodated in said cylindrical concave portion, said plurality of interlocking grooves being formed on a front surface of said inner tubular portion, and said retaining member being interposed between said groove end and said drag disk such that said drag disk is retained in said cylindrical concave portion.

11. The component assembly of a fishing reel as set forth in claim 1, further comprising a seal member that is fixed to said second end face and closes said interlocking grooves.

12. The component assembly of a fishing reel as set forth in claim 1, wherein said cylindrical concave portion has a columnar shape and opens to said first end face; and said interlocking grooves are formed on an inner surface of said cylindrical concave portion and open to said second surface, such that said interlocking grooves have a semi-circular cross section.

13. The component assembly of a fishing reel as set forth in claim 1, wherein said first component is made of synthetic resin by die-casting; and said cylindrical concave portion and said interlocking grooves of said first component are shaped so as to be formed by die-casting.

14. A spinning reel comprising:

a handle;

a reel unit rotatively supporting said handle;

a rotor supported at a front end of said reel unit and rotatable about a spool shaft;

a spool for winding fishing line on an outer periphery thereof, said spool being disposed at a front end of said rotor so as to be shiftable front and rear; and a drag mechanism for applying a drag force to said spool by braking rotation of said spool in a direction reeling off the fishing line, said drag mechanism having
 a drag knob screwed to a front end of said spool shaft, said drag knob including a main knob unit and a presser unit that is pressed down by said main knob unit, at least a portion of said presser unit being accommodated in said main knob unit, and
 at least one drag disk that is pressed together by said drag knob, said disk being accommodated in said spool, at least one of said spool and said main knob unit having
 a body extending along an axis and having first and second end faces at opposite ends of the axis,
 a cylindrical concave portion formed on said first end face,
 a plurality of interlocking grooves that is formed on an inner surface of said cylindrical concave portion and opens to said second face, said plurality of interlocking grooves extending in a direction of the axis of said body up to a groove end which is formed on an axial opposite side of said first end face, said plurality of interlocking grooves being formed at a certain spacing in a circumferential direction, and
 a retaining member inserted into said concave portion from a first-end-face side, said retaining member having a plurality of engagement portions that can interlock with said plurality of interlocking grooves, and a plurality of contact portions that is formed in one piece with said plurality of engagement portions.

15. The spinning reel as set forth in claim 14, wherein said spool has an inner tubular portion, which is said body, said inner tubular portion has said cylindrical concave portion on its rear end face, said drag disk being accommodated in said cylindrical concave portion, said plurality of interlocking grooves being formed on a front surface of said inner tubular portion, and said retaining member being interposed between said groove end and said drag disk such that said drag disk is retained in said cylindrical concave portion.

16. The spinning reel as set forth in claim 14, wherein said main knob unit includes
  said body;
  said cylindrical concave portion formed on a front end face of said body;
  said plurality of interlocking grooves formed on a rear end face of said body, and
  said retaining member being interposed between said groove end and said portion of said presser member.

17. The spinning reel as set forth in claim 16, wherein said main knob unit further includes
  a nut portion that is screwed to said spool shaft, and
  a nut accommodating portion that is formed at a center portion of said cylindrical concave portion and accommodates said nut such that said nut portion is non-rotatable and axially shiftable relative to said nut accommodating portion, and said drag knob includes a spring member urging said presser member and said main knob unit away from one another.

18. The spinning reel as set forth in claim 16, wherein said spool has an inner tubular portion, which is said body, said inner tubular portion has said cylindrical concave portion on its rear end face, said drag disk being accommodated in said cylindrical concave portion, said plurality of interlocking grooves being formed on a front surface of said inner tubular portion, and said retaining member being interposed between said groove end and said drag disk such that said drag disk is retained in said concave portion.

\* \* \* \* \*